United States Patent [19]

Hruby

[11] 3,870,798

[45]*Mar. 11, 1975

[54] PROCESS FOR PRODUCING A LIVESTOCK FEED

[76] Inventor: Frank J. Hruby, 2809 Tallmadge Rd., Ravenna, Ohio 34266

[*] Notice: The portion of the term of this patent subsequent to Jan. 22, 1991, has been disclaimed.

[22] Filed: Sept. 13, 1973

[21] Appl. No.: 397,072

Related U.S. Application Data

[63] Continuation-in-part of Ser. No. 70,763, now Pat. No. 3,787,583 is a continuation of Ser. No. 550,798, May 17, 1966, abandoned.

[52] U.S. Cl.............. 426/53, 34/218, 426/59, 426/464, 426/478
[51] Int. Cl........ A23k 1/10, A23k 1/06, A23k 1/08
[58] Field of Search....................... 426/53

[56] References Cited
UNITED STATES PATENTS
3,787,583  1/1974  Hruby................... 426/53

OTHER PUBLICATIONS

Cook, "The Chemistry and Biology of Yeasts," 1958 Academic Press, June, New York, pgs. 303–305.

*Primary Examiner*—Raymond N. Jones
*Attorney, Agent, or Firm*—Watts, Hoffmann, Fisher & Heinke Co.

[57] ABSTRACT

A method for making livestock feed from a raw garbage mass by screening, comminuting, pressure-cooking with the steam at above atmospheric pressure to sterilize and liquify the batch, cooling and fermenting, passing air through the batch during fermentation, drying, and comminuting, the entire process being carried out while retaining the grease of the garbage mass.

3 Claims, No Drawings

PROCESS FOR PRODUCING A LIVESTOCK FEED

This is a continuation-in-part of copending application Ser. No. 70763 filed March 9, 1970, now U.S. Pat. No. 3,787,583, which in turn is a continuation of application Ser. No. 550,798, filed May 17, 1966, now abandoned.

The present invention relates generally to a process or method for producing feed for livestock, poultry or other animals, utilizing waste foodstuffs as raw materials. More particularly, the present invention relates to a process for manufacturing such feed from garbage. More specifically, the present invention relates to a unique method employing a novel combination of steps to process garbage into livestock feed.

Certain prior art processes have been practiced in producing livestock feed and fertilizers from various types of waste raw materials, including slaughter-house wastes, cheese manufacturing or dairy processing waste, brewing wort or wastes, fish or seafood scraps, sewage, and other similar materials. Such methods or processes have required multiple sterilization, high pressure digestion, and other expensive and time-consuming processing operations or steps, in order that the process produce commercially acceptable livestock feed. Moreover, the feed product thus obtained still has not attained certain minimal standards required for livestock feed, in terms of protein, vitamin, starch and carbohydrate balances. Therefore, it has been necessary to augment these processed waste materials with additives or other supplemental feed materials.

Certain other prior art process concepts have contemplated employing garbage and kitchen waste as a raw material for the production of animal foods. However, these concepts have not encompassed processing steps or operations insuring adequate control over the stability of contents of the resultant feed product. Therefore, these processes have not been commercially exploited to any extent, owing to the necessity for employing expensive feed material additives or fillers.

Prior art processes already known include those shown in the following U.S. Patents:

1,307,992 Wells
1,210,250 Young
1,440,727 Faust
2,162,175 Moreton

In addition to the foregoing problems, modern municipalities and urban communities have been confronted with the perplexing problem of providing adequate garbage and sewage treatment and disposal plants and facilities, without creating additional problems in terms of pollution of streams, water supplies, and the atmosphere with waste and fumes discharging or emanating from these treatment plants or facilities.

It is an object of the present invention to provide an improved method or process for producing inexpensive and high quality livestock feed from garbage or waste foodstuffs.

It is a further object of the invention to furnish an improved process as aforesaid, alleviating or substantially eliminating the problems encountered in prior art methods for processing other waste materials into animal feed.

It is a still further object of the invention to provide a unique process employing a novel combination of method operations to process garbage into livestock feed having a nutrition content requiring only a minimum of augmentation with complementary or supplementary feed materials.

It is another object of the invention to provide a method for processing garbage into a useful and marketable feed product, rather than simply incinerating or treating and disposing of the same.

By way of summary, the invention is a process for manufacturing livestock feed from raw garbage by refining a garbage mass, i.e., removing foreign, non-food, particles, comminuting the garbage mass, then batch processing the garbage mass by feeding a batch of uncooked garbage into a pressure tank and adding a neutralizer to the batch in an amount sufficient to establish a substantially neutral state of the batch, cooking the neutral batch in the pressure tank at a pressure above atmospheric and at temperatures above 212° Fahrenheit for a sufficient time to sterilize and liquify the batch, thereafter cooling the batch to a temperature below 150° Fahrenheit, adding a fermenting agent to the cooled batch, fermenting the entire liquified batch while passing air through the liquified batch until emission of carbon dioxide substantially stops, subsequently drying the fermented batch, and thereafter comminuting the dried batch, the entire process being carried out while retaining the grease of the garbage mass. The passing of air through the liquified batch during fermentation results in an improved, i.e., higher, protein value of the resulting batch. At the same time, the air tends to evaporate the alcohol from the liquified batch, produced by the fermentation. While this essentially prevents recovery of the alcohol, certain market conditions place a higher economic value on the increased protein content of the batch, making the step of passing air through the batch during fermentation a highly desirable improvement.

The above and other features, objects and advantages of the present invention will become more apparent and better understood upon reference to the detailed description in the following specification.

While the process, including the specific operations or steps, as described herein in detail, are preferred embodiments or modes of practice of the present invention, it will be appreciated by those skilled in the art that the principles of the invention may be applied with equal facility with certain variations or changes in operations performed, materials, catalysts, or reactants added and their proportions. Such variations, changes or substitutions of equivalent operations or materials are comprehended within the scope and spirit of the invention set forth in the appended claims.

Referring to the process in detail, raw garbage is hauled or transported to a processing plant or site where it is suitably screened to separate and discard foreign non-food particles and solids of a size greater than a predetermined mesh rating. The screening may include the removal of ferrometallic materials with suitable electromagnets.

The screened garbage is conveyed, as by belt conveyor, pneumatic conveyor, or other automatic conveyor means, to a comminuter such as grinder or crusher equipment, e.g., rotary mills or presses, which mechanically condition or refine the garbage mass for the subsequent steps. The refined garbage is then transported by automatic conveyor and fed into a pressure vessel.

The garbage will vary in its moisture content according to the season of the year. Therefore, it may be necessary to add water to the charge of garbage in the pressure vessel in order to produce a batch of liquid or fluid consistency, but in which the garbage is not fully liquified. Similarly, the acidity of the garbage batch will vary seasonally; although, the batch will usually be acid due to the preponderant presence of acetic acid. In any event, sufficient quantity of slaked lime or other suitable buffering agent or neutralizing material or alkali should be metered into the pressure tank 12 to neutralize or buffer the garbage charge to a generally neutral state on the pH scale.

The fluid garbage charge is enclosed within the pressure vessel and then heated and pressure cooked with steam introduced into the vessel at approximately 15 to 20 p.s.i. steam pressure, with corresponding steam temperature ranges, the preferred pressure being about 17 p.s.i. The pressure cooking proceeds for about two hours until substantially all bacteria in the substance are killed and the charge has been substantially sterilized and liquified.

Following the pressure sterilization operation in the closed pressure vessel, the charge is preferably transferred to a closed cooling and fermentation vessel, where the charge of substantially sterilized and neutralized, liquified garbage is cooled to a temperature range of 50° F. to 150° F., the preferable terminal temperature for cooling being about 95° F. At this point, a suitable amount of liquid brewer's yeast or other suitable fermentation agent is added to the charge in the closed cooling and fermentation vessel, preferably through a saccharometer controlled or regulated valve.

Fermentation in the vessel is permitted to proceed and continue until substantially all of the carbon dioxide is emitted from the fermenting batch and drawn off. During fermentation, oxygen is introduced into the fermenting batch, preferably in the form of air under pressure bubbled through the batch from a pipe or pipes or other outlets within the lower part of the fermentation vessel. For best results the bubbling of air through the batch is continued throughout the fermentation, until carbon dioxide substantially stops being emitted. This flow of air tends to evaporate and carry from the batch the alcohol produced by the fermentation process.

When the fermentation has substantially concluded, the batch is discharged by suitable conveying means into a continuous drier mechanism. The batch being discharged from the fermentation vessel is preferably sampled to determine the level of contents of starch and carbohydrates. The batch discharged should have more than adequate portions and contents of protein, vitamins and minerals, notwithstanding seasonal variations in constituency and content of the garbage raw materials.

Experimentation with the process according to the present invention has revealed that a charge of approximately 1 ton of liquified garbage can be processed and dried using only about 1 ton of coal or fuel or heating medium having the equivalent thermal content.

From the continuous drying mechanism the dried batch is fed or conveyed to a hammermill or other suitable comminuter or other pulverized equipment. This produces a pulpy product which is then bagged or packaged manually or with suitable equipment.

Apparatus of a type generally suitable for processing garbage, except for the introduction of air into the fermentation vessel is disclosed in the aforementioned application.

It should be apparent from the foregoing descriptions that the above-described preferred improved livestock feed process accomplishes the several objects of the invention.

What is claimed is:

1. A process of producing livestock feed from a raw garbage mass, comprising the steps of:
    a. first refining said garbage mass by
        i. removing foreign, non-food, particles,
        ii. comminuting the garbage mass;
    b. then batch processing the garbage mass by
        i. feeding a batch of uncooked garbage mass into a pressure tank,
        ii. adding a neutralizer to the batch in an amount sufficient to establish a substantially neutral state of the batch,
        iii. cooking the neutral batch in the pressure tank at pressure above atmospheric and at temperatures above 212° F. for a sufficient time to sterilize and liquify said batch,
        iv. thereafter cooling the batch to a temperature below 150° F.,
        v. adding a fermenting agent to the cooled batch,
        vi. then fermenting the entire liquified batch until emission of carbon dioxide substantially stops, and
        vii. introducing oxygen under pressure into the liquified batch during the fermenting step;
    c. subsequently drying said fermented batch;
    d. thereafter comminuting said dried batch;
    e. said entire process being carried out while retaining the grease of the garbage mass.

2. A process of producing livestock feed from a raw garbage mass, consisting essentially in the steps of:
    a. first refining said garbage mass by
        i. removing foreign, non-food, particles,
        ii. comminuting the garbage mass;
    b. then batch processing the garbage mass by
        i. feeding a batch of uncooked garbage mass into a pressure tank,
        ii. adding a neutralizer to the batch in an amount sufficient to establish a substantially neutral state of the batch,
        iii. cooking the neutral batch in the pressure tank at pressure above atmospheric and at temperatures above 212° F. for a sufficient time to sterilize and liquify said batch,
        iv. thereafter cooling the batch to a temperature below 150° F.;
        v. adding a fermenting agent to the cooled batch, and,
        vi. then fermenting the entire liquified batch while introducing air into the batch until emission of carbon dioxide substantially stops;
    c. subsequently drying said fermented batch while removing any alcoholic vapors that may be present; and
    d. thereafter comminuting said dried batch;
    e. said entire process being carried out while retaining the grease of the garbage mass.

3. A process of producing livestock feed from a raw garbage mass, consisting essentially in the steps of:
    a. first refining said garbage mass by
        i. removing foreign, non-food, particles,
        ii. limiting the maximum size of garbage solids that comprise said mass, and
        iii. comminuting the mass;

b. then batch processing the garbage mass by
   i. feeding a batch of said refined mass into a pressure tank,
   ii. adding water to the batch when the batch is not fluid,
   iii. adding a neutralizer to the batch in an amount sufficient to establish a substantially neutral state of the batch,
   iv. thereafter sterilizing and liquifying the batch by cooking the batch in a closed vessel under steam at pressure of between 15 to 20 pounds per square inch gauge at temperatures between 240 and 270° F. for approximately 2 hours,
   v. then cooling the batch to a temperature between 50 and 150° F.,
   vi. adding a fermenting agent to the cooled batch, and
   vii. then fermenting the entire liquified batch while introducing air under pressure into the batch until emission of carbon dioxide substantially stops;
c. subsequently drying said fermented batch while removing any alcoholic vapors that may be present; and
d. thereafter comminuting said dried batch;
e. said entire batch process being carried out while retaining the grease of the garbage mass.

* * * * *